(12) United States Patent
Ja

(10) Patent No.: US 11,320,113 B2
(45) Date of Patent: May 3, 2022

(54) METHODS AND SYSTEMS FOR A MULTI-WAVELENGTH ILLUMINATION SYSTEM

(71) Applicant: Phoseon Technology, Inc., Hillsboro, OR (US)

(72) Inventor: Shiou-Jyh Ja, Portland, OR (US)

(73) Assignee: Phoseon Technology, Inc., Hillsboro, OR (US)

(*) Notice: Subject to any disclaimer, the term of this patent is extended or adjusted under 35 U.S.C. 154(b) by 0 days.

(21) Appl. No.: 17/069,706

(22) Filed: Oct. 13, 2020

(65) Prior Publication Data

US 2021/0116099 A1 Apr. 22, 2021

Related U.S. Application Data

(60) Provisional application No. 62/916,688, filed on Oct. 17, 2019.

(51) Int. Cl.

| | |
|---|---|
| *F21V 5/00* | (2018.01) |
| *F21V 9/20* | (2018.01) |
| *G02B 21/06* | (2006.01) |
| *G02B 23/24* | (2006.01) |
| *F21V 5/04* | (2006.01) |
| *G02B 27/14* | (2006.01) |
| *F21Y 113/10* | (2016.01) |
| *F21Y 115/10* | (2016.01) |

(52) U.S. Cl.
CPC ............... *F21V 5/008* (2013.01); *F21V 5/04* (2013.01); *F21V 9/20* (2018.02); *G02B 21/06* (2013.01); *G02B 23/2469* (2013.01); *G02B 27/141* (2013.01); *F21Y 2113/10* (2016.08); *F21Y 2115/10* (2016.08)

(58) Field of Classification Search
CPC .. G02B 27/141; G02B 23/2469; G02B 21/06; F21V 5/008; F21V 9/20; F21V 5/04
See application file for complete search history.

(56) References Cited

U.S. PATENT DOCUMENTS

| | | | | |
|---|---|---|---|---|
| 4,823,357 | A * | 4/1989 | Casey ................. | H01S 5/02325 372/92 |
| 6,995,841 | B2 * | 2/2006 | Scott ........................ | G01J 3/10 250/459.1 |
| 7,212,344 | B2 * | 5/2007 | Keuper ................ | H04N 9/3111 348/E9.027 |
| 8,979,301 | B2 * | 3/2015 | Moore ................. | A61B 5/0071 362/231 |
| 9,482,870 | B2 * | 11/2016 | Hanano ................. | G02B 27/30 |

(Continued)

*Primary Examiner* — Arman B Fallahkhair
(74) *Attorney, Agent, or Firm* — McCoy Russell LLP

(57) ABSTRACT

Methods and systems are provided for a light emitting device. In one example, an illumination system comprises a plurality of light sources, each light source of the plurality of light sources comprising a light emitting diode configured to emit a collimated beam of light of a color, a plurality of reflective optical components oriented identically to one another, wherein the plurality of reflective optical components is configured to direct the first collimated beam, the second collimated beam, the third collimated beam, the fourth collimated beam, and the fifth collimated beam along a common axis, and an output positioned to receive light along the common axis, wherein the output is configured to generate an output beam.

20 Claims, 3 Drawing Sheets
(1 of 3 Drawing Sheet(s) Filed in Color)

(56) References Cited

U.S. PATENT DOCUMENTS

| | | | |
|---|---|---|---|
| 10,520,824 B2 * | 12/2019 | Hugers | G02B 27/142 |
| 2009/0040523 A1 * | 2/2009 | Brukilacchio | F21V 7/0066 |
| | | | 356/432 |
| 2010/0283978 A1 * | 11/2010 | Hawryluk | G03F 7/70075 |
| | | | 355/18 |
| 2020/0318810 A1 * | 10/2020 | Tesar | F21V 9/20 |

* cited by examiner

METHODS AND SYSTEMS FOR A MULTI-WAVELENGTH ILLUMINATION SYSTEM

CROSS REFERENCE TO RELATED APPLICATIONS

The present application claims priority to U.S. Provisional Application No. 62/916,688, entitled "MULTI-WAVELENGTH ILLUMINATION SYSTEM," and filed on Oct. 17, 2019, the entire contents of which are hereby incorporated by reference in their entirety for all purposes.

FIELD

Embodiments of the subject matter disclosed herein relate to multi-wavelength light sources that may provide high irradiation illumination at multiple narrow-band wavelength regions for microscopy and/or endoscopy. The desired spectral bands may extend from ultra-violet (UV) to near infrared (NIR) wavelength.

BACKGROUND

In some examples, the light is coupled in an optical fiber and/or light guide for the flexibility and versatility to work with other instruments. Light emitting diodes (LED) may be used as the light source for its simplicity, lower cost, and robustness. However, the coupling efficiency into the fiber or light guide may be challenging in some cases due to the large emitting area and Lambertian-type of emission distribution. In addition, lack of sufficient LED power in some desired wavelength regions has been a problem.

BRIEF DESCRIPTION

In one example, at least some of the above issues may be at least partially addressed by an illumination system, comprising a first light source comprising a first light emitting diode (LED) configured to emit a first collimated beam of light of a first color, a second light source comprising a second LED configured to emit a second collimated beam of light of a second color, a third light source comprising a third LED configured to emit a third collimated beam of light of a third color, a fourth light source comprising a fourth LED configured to emit a fourth collimated beam of light of a fourth color, a fifth light source comprising a fourth LED configured to emit a fourth collimated beam of light of a fourth color, a plurality of reflective optical components oriented identically to one another, wherein the plurality of reflective optical components is configured to direct the first collimated beam, the second collimated beam, the third collimated beam, the fourth collimated beam, and the fifth collimated beam along a common axis, and an output positioned to receive light along the common axis, wherein the output is configured to generate an output beam.

The illumination system is capable of coupling the emission of multiple LEDs into a single output light guide with improved efficiency. The optical output efficiency may be increased by arranging a dichroic mirror and LEDs in a way to reduce the excessive losses in the system. Further, the LED light collection efficiency may be improved by using, for example, a stack of two aspheric lenses at relatively close distance to the LED emitting surface. The lens assembly cost may also be reduced by using low-cost glass material and simple assembly. Also multiple LEDs may be tiled together to form a larger emission surface with a net increase on the output illumination power.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will be better understood from reading the following description of non-limiting embodiments, with reference to the attached drawings, wherein below.

DETAILED DESCRIPTION

Figure 1:
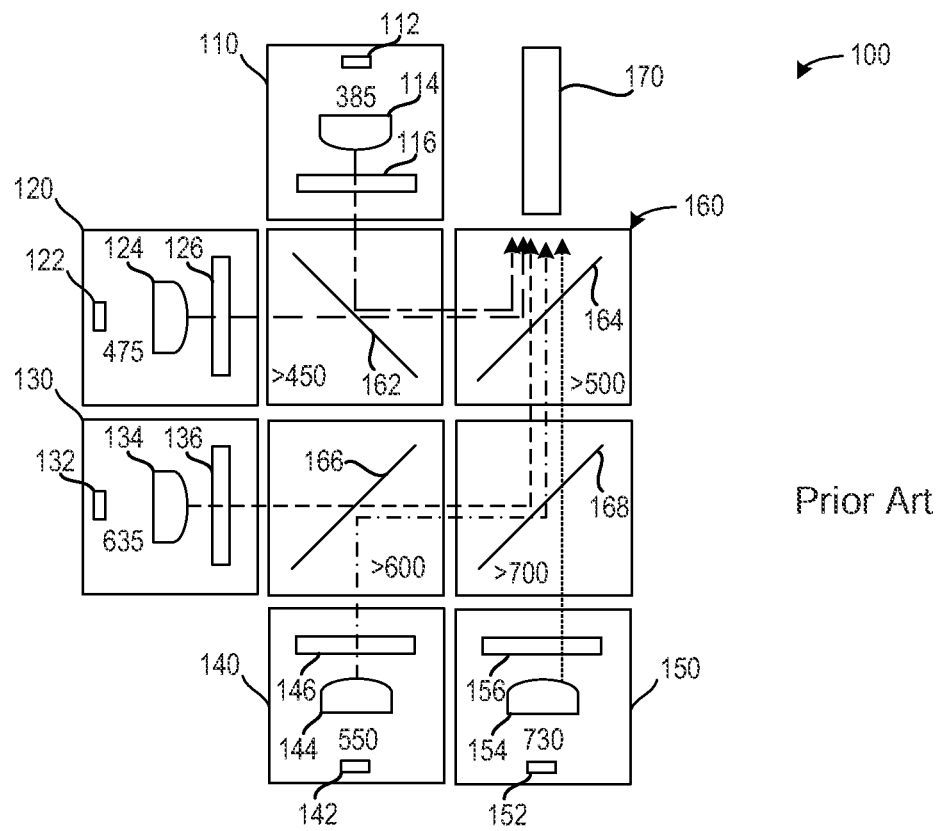
FIG. 1 shows a first embodiment of a multiple light sources of a previous example.
Figure 2:
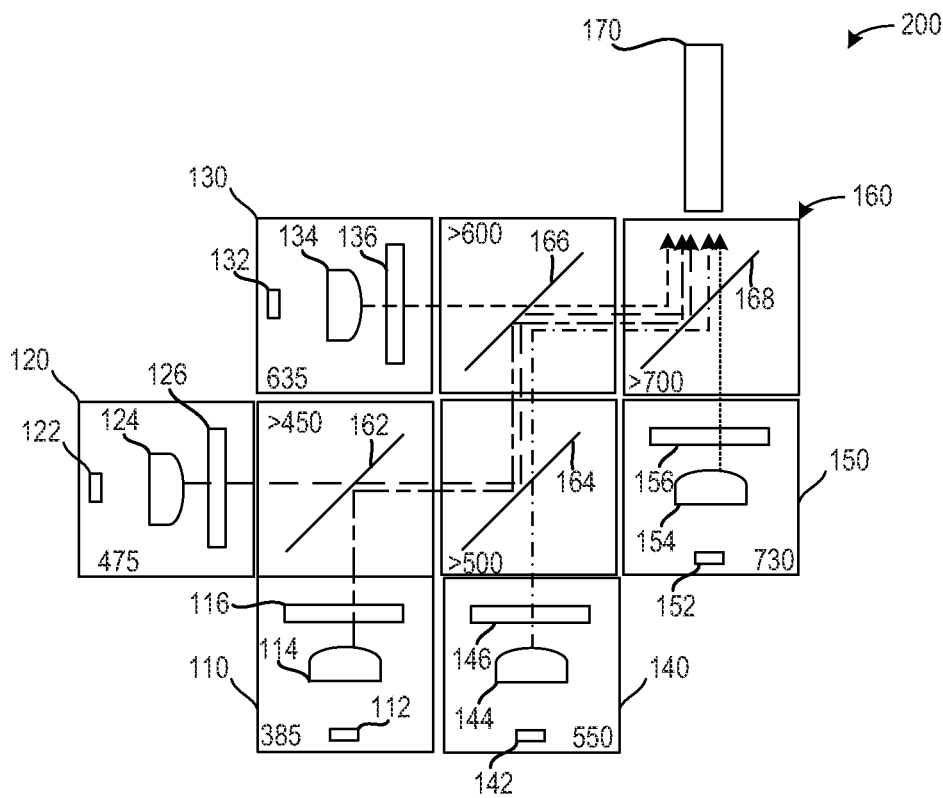
FIG. 2 shows a second embodiment of an illumination system.
Figure 3:
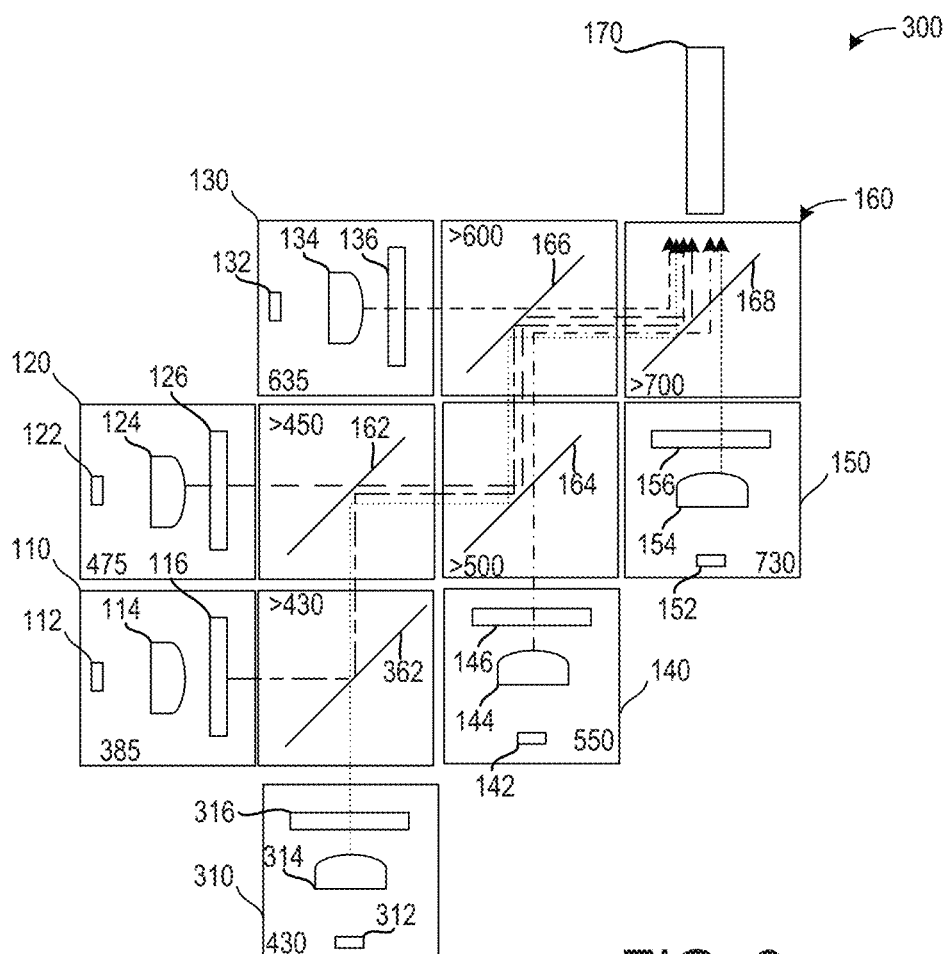
FIG. 3 shows a third embodiment of the illumination system.
Figure 4:
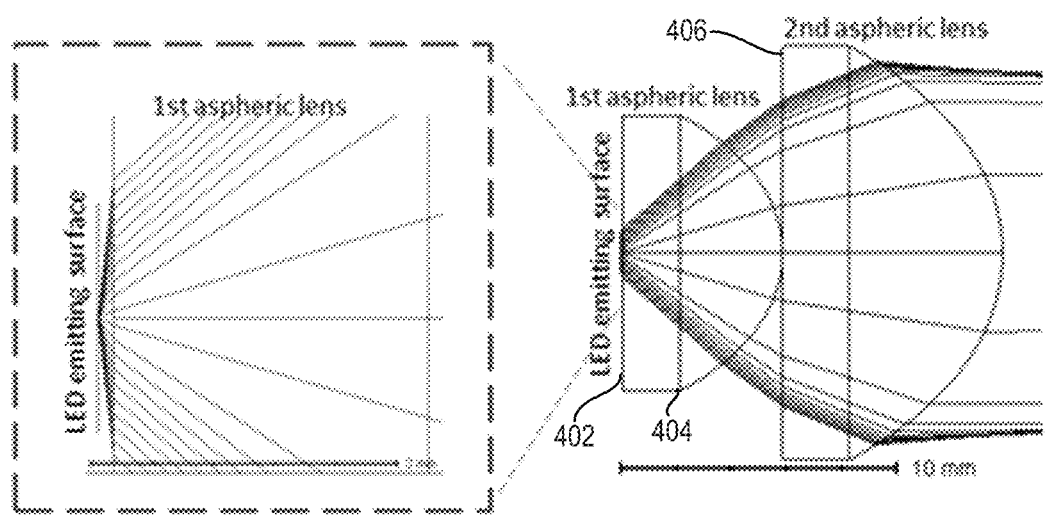
FIG. 4 shows a first embodiment of a lens assembly.
Figure 5:
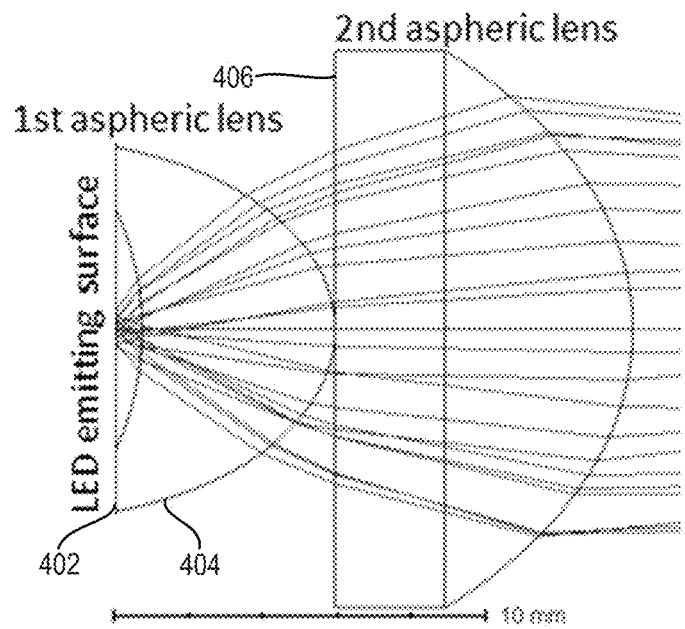
FIG. 5 shows a second embodiment of the lens assembly.
Figure 6:
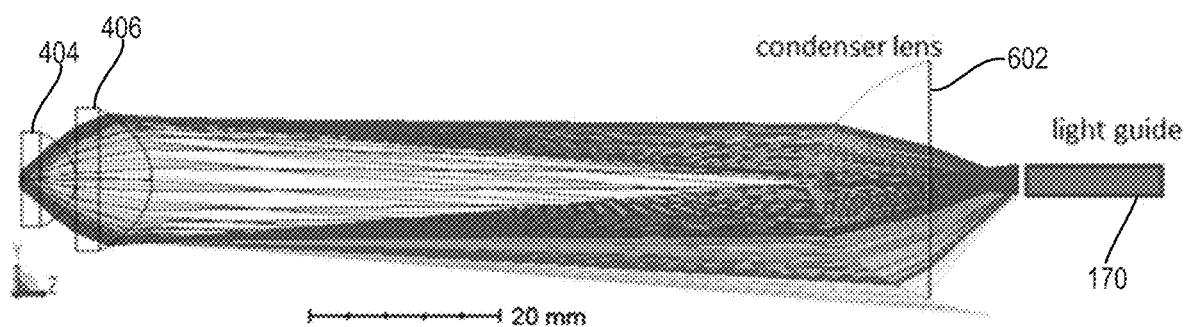
FIG. 6 shows an embodiment of a condenser lens.

The following description relates to systems and methods for multi-wavelength light sources configured to provide high irradiance illumination at multiple narrow band wavelength regions (less than 20 nm). The light-sources may be configured to be light sources for microscopy and/or endoscopy. The desired spectral bands may extend from ultraviolet (UV) to near infrared (NIR) wavelength. FIG. 1 shows a first embodiment of a previous example of a multi-color illumination system. FIG. 2 shows a second embodiment of a multi-color illumination system. FIG. 3 shows a third embodiment of the multi-color illumination system. FIG. 4 shows a first embodiment of a lens assembly. FIG. 5 shows a second embodiment of the lens assembly. FIG. 6 shows an embodiment of a condenser lens.

Some examples of the approach described herein utilize a configuration of a dichroic mirror which has a larger transmission loss (~10%) than reflection loss (~2%). By arranging the LEDs (light emitting diodes) and the dichroic mirror, as illustrated in the examples herein, no more than one dichroic mirror transmission may be desired to couple the light into the output light guide. The optical layout may thus allow a modular arrangement so that additional new sources can be added-in with minimum impact to the entire system.

A lens assembly may be provided by stacking a pair of aspheric lens comprising a cost-effective glass material to achieve LED emission collection efficiency higher than 90% with low production cost. The facet of the first lens toward the LEDs has a plano or a concave surface so that the air gap between the lens and LED emitting surface can be reduced to, optionally, less than 1 mm. Such close proximity results in an extremely large numerical aperture at the source side so that high collection efficiency can be achieved. In some examples, the exactly two lenses in the lens assembly (or alternatively at least two or more) are designed to be in contact for the ease of accurate assembly, which allows cost-effective mounting to be used and to reduce the size of the lens assembly.

In order to combine multiple light sources co-axially and couple the light into a common output fiber or light guide, dichroic mirrors may be used. One arrangement of a previous example is shown in FIG. 1. The wavelength in nanometers of each light source in indicated in FIG. 1, and the cutoff wavelength of the long-pass dichroic mirrors are also noted.

FIG. 1 illustrates a multi-light arrangement 100 comprising a plurality of light sources. A first light source 110 comprises a first LED 112, a first LED lens 114, and a first filter 116. The LED lens 114 can be a singlet, a doublet, or a multi-element lens. The filter 116 is optional, which provides further refinement of the LED emitting spectrum. One or more of the following LED lenses and the filters may also be optional. The first light source 110 directs a violet light of 385 nm toward a first dichroic mirror 162 and a second dichroic mirror 164 of a plurality of dichroic mirrors 160. The violet light is reflected off the first dichroic mirror 162 and the second dichroic mirror 164 before reaching an output 170.

A second light source 120 comprises a second LED 122, a second LED lens 124, and a second filter 126. The second light source 120 directs a blue light of 475 nm toward the first dichroic mirror 162 and the second dichroic mirror 164 prior to reaching the output 170. The blue light is transmitted through the first dichroic mirror 162 and reflected off the second dichroic mirror 164 prior to reaching the output 170.

A third light source 130 comprises a third LED 132, a third LED lens 134, and a third filter 136. The third light source 130 directs a red light of 635 nm toward a third dichroic mirror 166, a fourth dichroic mirror 168, and the second dichroic mirror 164 prior to reaching the output 170. The red light is transmitted through the third dichroic mirror 166, reflected off the fourth dichroic mirror 168, and transmitted through the second dichroic mirror 164 before reaching the output 170.

A fourth light source 140 comprises a fourth LED 142, a fourth LED lens 144, and a fourth filter 146. The fourth light source 140 directs a yellow light of 550 nm toward the third dichroic mirror 166, the fourth dichroic mirror 168, and the second dichroic mirror 164 prior to reaching the output 170. The yellow light is reflected off the third dichroic mirror 166, reflected off the fourth dichroic mirror 168, and transmitted through the second dichroic mirror 164 before reaching the output 170.

A fifth light source 150 comprises a fifth LED 152, a fifth LED lens 154, and a fifth filter 156. The fifth light source 150 directs a red light of 730 nm toward the fourth dichroic mirror 168 and the second dichroic mirror 164 prior to reaching the output 170. The red light is transmitted through the fourth dichroic mirror 168 and the second dichroic mirror 164 before reaching the output 170.

The light rays of the LED emission follow the reflection or transmission rule set up by the dichroic mirror to reach the output fiber or light guide. The dichroic mirrors may be designed to transmit longer wavelength light and reflect the shorter wavelength one. For example, the 730-nm light will go through two transmissions, the 635-nm light two transmissions and one reflection, and 390-nm light two reflections to reach the output light guide. The transmission usually causes a greater loss (e.g. 10%) comparing to the reflection (e.g. 2%) in this design so that two transmissions may cause 19% loss while two reflections only 4% of loss. Therefore, the long-wavelength (red) channels will suffer greater loss than the shorter-wavelength (blue) channels in the layout shown in FIG. 1.

However, red LEDs have relatively lower power compared to blue LEDs. In combination with the higher loss due to the dichroic mirror design and above layout, the red-color illumination may be weaker and sometimes replaced by laser light sources, which can increase costs and complicate than the LED light sources. In addition, the narrower bandwidth and high-degree of coherence of the laser sources may not be appreciated in the illumination applications due to the limited excitation bandwidth and intensity non-uniformity caused by the laser speckle.

In order to address these issues, one example approach uses a dichroic mirror arrangement shown in FIG. 2 that will demand only one transmission for every channel so that the excessive transmission loss of the arrangement of FIG. 1 can be avoided. In addition, light beams from red channels take minimum reflection to reach the output fiber or light guide. The end result is improved optical throughput for the red (weaker) channels.

In this alternative layout, the dichroic mirrors form a linear waveguide to bounce the light beams from each source into the output light guide. The light beams of all channels, except the lowest-wavelength channel, go through one dichroic mirror at 45° incidence angle into the waveguide and then will be reflected by the rest of dichroic mirrors downstream. For example, 730-nm light goes through 700-nm long-pass (LP) dichroic mirror and into the light guide. The 550-nm light goes through 500-nm LP dichroic mirror and then is reflected by the 600-nm and 700-nm dichroic mirrors. The 385-nm light travels a transmission-free entrance into the waveguide and four reflections before entering the light guide, which experiences still less loss than one transmission loss.

More specifically, a second arrangement 200 of a multi-light arrangement comprises the first light source 110, the second light source 120, the third light source 130, the fourth light source 140, and the fifth light source 150. As such, components previously described may be similarly numbered in this figure and subsequent figures.

The first light source 110 emits the violet light toward the plurality of dichroic mirrors 160, wherein the violet light is reflected off the first dichroic mirror 162, reflected off the second dichroic mirror 164, reflected off the third dichroic mirror 166, and then reflected off the fourth dichroic mirror 168 before reaching the output 170.

The second light source 120 emits the blue light toward the plurality of dichroic mirrors 160, wherein the blue light traverses the first dichroic mirror 162, reflects off the second dichroic mirror 164, reflects off the third dichroic mirror 166, and reflects off the fourth dichroic mirror 168 before reaching the output 170.

The third light source 130 emits the red light toward the plurality of dichroic mirror 160, wherein the red light traverses the third dichroic mirror 166 and reflects off the fourth dichroic mirror 168 before reaching the output 170.

The fourth light source 140 emits the yellow light toward the plurality of dichroic mirrors 160, wherein the yellow light traverses the second dichroic mirror 164, reflects off the third dichroic mirror 166, and reflects off the fourth dichroic mirror 168 before reaching the output 170.

The fifth light source 150 emits the red light toward the plurality of dichroic mirrors 160, wherein the red light traverses the fourth dichroic mirror 168 before reaching the outlet 170.

In addition to the improved optical efficiency, this linear waveguide arrangement of the dichroic mirrors also allows new channel to be added in with minimum disturbance to the existing configuration and performance. For example, an additional 430-nm light source is added into the system and the new layout is shown in FIG. 3. The only difference between a third arrangement 300 of FIG. 3 and the second arrangement of FIG. 2 is that it will take one more reflection for the light from the 385-nm channel to reach the output light guide. Since reflection of the dichroic mirror introduces only minimum loss and the light beam out of the LED lens system is highly collimated, there is minimum penalty due to adding a new channel. More specifically, the third arrangement comprises a sixth light source 310 and a fifth dichroic mirror 362. The first light source 110 emits the violet light, which reflects off each of the first, second, third, fourth, and fifth dichroic mirrors. The sixth light source 310 comprises a sixth LED 312, a sixth LED lens 314, and a sixth filter 316. The sixth light source 310 emits a light with a 430 nm wavelength, resulting in a violet color. In some examples, the sixth light source may comprise an indigo color. The violet light traverses the fifth dichroic mirror 362, reflected off the first dichroic mirror 162, reflected off the second dichroic mirror 164, reflected off the third dichroic mirror 166, and reflected off the fourth dichroic mirror 168 before reaching the output 170.

In each of the examples of FIGS. 2 and 3, the plurality of spectrally selective reflective optical components (e.g., the dichroic mirrors) are arranged identically to one another. In one example, the dichroic mirrors are arranged parallel to one another, which allows the arrangement 300 to be modified from the arrangement 200 with reduced manufacturing difficulties relative to the embodiment of FIG. 1. The optical components are spectrally selective based on a wavelength of the light being emitted from the light source.

In this way, an illumination device may comprise a plurality of light sources, wherein each of the light sources may provide a different wavelength of light. In one example, the plurality of light sources comprises as few as five light sources and as many as 10 light sources. Additionally or alternatively, the illumination device may comprise greater than 10 light sources. A number of spectrally selective reflective optical components may be equal to the number of light sources, wherein the optical components may be dichroic mirrors in some examples.

The LED lens is configured to collect the roughly Lambertian distributed emission from the bare LED lens. The numerical aperture (NA) may be used to measure the collection efficiency of the lens system. In the air the NA is less than one since it is the sine value of the half collection cone angle. An example combines two short-focal-length aspheric plano lenses with zero air gap to form a collimation lens assembly that can achieve a NA of greater than 0.99 in the air space. The first aspheric lens 404 has a back focal length of about 4 mm and the second aspheric lens 406 has a focal length of 7 mm. In this way, the first aspheric lens 404 and the second aspheric lens 406 are in face-sharing contact. As the plano surface of the first lens 404 approaches to the LED emitting surface 402 as it is shown in FIG. 4, a desired NA and hence high collection efficiency can be achieved. One optional air gap between the LED emitting surface and the plano surface of the first lens is less than 1 mm in order to achieve high collection efficiency and for a semi-collimated beam bundle after the lens assembly.

The close proximity of the LED surface and the lens surface may cause degradation to the bond wire or the LED by shorting the wire to the nearby conducting surface. Some provision may be used to address these issues. For example, the bound wires may be arranged to run in parallel with the LED surface until contact points. In addition, some dielectric gel coating may be applied on the bond wire to prevent shorting when they are ever shifted by the lens.

Another possible embodiment of the lens assembly is shown FIG. 5 where the first facet of the first aspheric lens has a concaved surface so that LED can reside at close proximity to the lens to achieve high collection efficiency. The concaved surface allows an increased air gap between the LED emitting surface and lens surface so that the desired spacing can be slightly increased to be less than 1 mm.

At an end of the optical system opposite the LED, a condenser lens 602 is used to focus the semi-collimated beams into the output light guide 170, as it is shown in the FIG. 6. An aspheric lens with matching numerical aperture to the light guide is chosen to maximize the coupling efficiency into the light guide. The NA of the condenser may be increased or reduced to change the light distribution after the light beam exiting the light guide. There might be a trade-off between the optical output and the illumination uniformity. For example, by using a condenser of larger NA than the one of light guide, a less intensity gradient can be achieved with the penalty of lower coupling efficiency into the light guide.

Since the LED is an area emitter, the emission from the edge of the LED may be off-axis and hence comprise a lower coupling efficiency into the output light guide. The light beams in FIG. 6 with different colors representing emission from various spots on LED where blue is at center, green is 0.5 mm away from center, red is 1 mm away, and gold is 1.5 mm away. Although LED emission from a spot away from the center (optical axis) may have lower coupling efficiency, the total larger emitting surface may gain back even more power. In the end, the net increase of the total power coupled into the output light guide may justify the efficiency reduction. For example, by increasing the LED linear dimension by a factor of two, the efficiency may drop to 50%. However, the total power from the LED is increased four times. Therefore, the end result is two-fold increase in the total power coupled into the light guide. The LED emitting size increasing can be achieved by using large LED die or by tiling multiple LEDs in a closely packed array format such as a 2×2 array.

The technical effect of the multi-wavelength LED illumination system is to improve optical efficiency while further providing an option to introduce a new wavelength channel. By arranging the dichroic mirrors in the layout of the present disclosure, the dichroic mirrors form a linear waveguide to bounce light beams from each source into an output light guide. The light beams of the light sources may reflect at only a 45° angle of incidence, except for the light source above 700 nm, into the output. This may increase optical throughput and mitigate transmission loss.

The above figures show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An illumination system for a microscopy device or an endoscopy device, the illumination system comprising: a first light source comprising a first light emitting diode (LED) configured to emit a first collimated beam of light of a first color; a second light source comprising a second LED configured to emit a second collimated beam of light of a second color; a third light source comprising a third LED configured to emit a third collimated beam of light of a third color; a fourth light source comprising a fourth LED configured to emit a fourth collimated beam of light of a fourth color; a fifth light source comprising a fifth LED configured to emit a fifth collimated beam of light of a fourth color; a plurality of spectrally selective reflective optical components oriented parallel identically to one another, wherein the plurality of spectrally selective reflective optical components is configured to direct the first collimated beam, the second collimated beam, the third collimated beam, the fourth collimated beam, and the fifth collimated beam along a common axis, and an output positioned to receive light along the common axis, wherein the output is configured to generate an output beam, wherein the plurality of spectrally selective reflective optical components comprises at least a first set of spectrally selective reflective optical components arranged along a first axis and a second set of spectrally selective reflective optical components arranged along a second axis that is parallel to and offset from the first axis, each of the first set and the second set comprising at least two spectrally selective reflective optical components; wherein the plurality of spectrally selective optical components are dichroic mirrors.

2. The illumination system of claim 1, wherein each of the first light source, the second light source, the third light source, the fourth light source, and the fifth light source comprises a LED lens and a filter.

3. The illumination system of claim 2, wherein the LED lens comprises a plano surface directed toward the LED emitting surface, and wherein the plano surface reduces a distance between the plano surface and the LED emitting surface to less than a threshold distance.

4. The illumination system of claim 3, wherein the threshold distance is 1 mm.

5. The illumination system of claim 1, wherein the first color is violet, the second color is blue, the third color is yellow, the fourth color is a first shade of red, and the fifth color is a second shade of red, wherein the second shade of red is darker than the first shade of red.

6. The illumination system of claim 1, wherein the plurality of spectrally selective optical components are at least four dichroic mirrors.

7. The illumination system of claim 1, wherein the plurality of spectrally selective optical components comprises four optical components.

8. The illumination system of claim 1, further comprising additional light sources and dichroic mirrors, wherein each of a total number of light sources and a total number of dichroic mirrors is less than or equal to 10.

9. A multi-wavelength illumination system for a microscopy device or an endoscopy device, the multi-wavelength illumination system comprising: a first light source comprising a first light emitting diode (LED) configured to emit a first collimated beam of light of a first color; a second light source comprising a second LED configured to emit a second collimated beam of light of a second color; a third light source comprising a third LED configured to emit a third collimated beam of light of a third color; a fourth light source comprising a fourth LED configured to emit a fourth collimated beam of light of a fourth color; a fifth light source comprising a fourth LED configured to emit a fourth collimated beam of light of a fourth color, wherein each of the first light source, the second light source, the third light source, the fourth light source, and the fifth light source comprises a LED lens and an optional a filter; a plurality of reflective optical components oriented parallel to one another, wherein the plurality of reflective optical components is configured to direct the first collimated beam, the second collimated beam, the third collimated beam, the fourth collimated beam, and the fifth collimated beam along a common axis, and an output positioned to receive light along the common axis, wherein the output is configured to generate an output beam, wherein the plurality of reflective optical components comprises at least a first set of reflective optical components arranged along a first axis and a second set of reflective optical components arranged along a second axis that is parallel to and offset from the first axis, each of the first set and the second set comprising at least two reflective optical components; wherein the plurality of reflective optical components comprises dichroic mirrors.

10. The multi-wavelength illumination system of claim 9, wherein the LED lens comprises a plano surface directed toward the LED emitting surface, and wherein the plano surface reduces a distance between the plano surface and the LED emitting surface to less than a threshold distance.

11. The multi-wavelength illumination system of claim 10, wherein the threshold distance is 1 mm.

12. The multi-wavelength illumination system of claim 9, wherein the plurality of reflective optical components comprises four dichroic mirrors.

13. The multi-wavelength illumination system of claim 12, further comprising a sixth light source and five dichroic mirrors, wherein the five dichroic mirrors are oriented parallel to one another.

14. The multi-wavelength illumination system of claim 9, wherein the first color comprises a wavelength of 250~400 nm, the second color comprises a wavelength of 400~500 nm, the third color comprises a wavelength of 500~600 nm, the fourth color comprises a wavelength of 600~700 nm, and the fifth color comprises a wavelength of 700~800 nm.

15. The multi-wavelength illumination system of claim 9, wherein the LED lens is a first lens, further comprising a second lens, wherein the first lens comprises a first focal length and the second lens comprises a second focal length, greater than the first focal length.

16. The multi-wavelength illumination system of claim 9, wherein a distance between an LED emitting surface and a plano surface of the LED lens is less than 500 µm.

17. The multi-wavelength illumination system of claim 9, wherein the multi-wavelength illumination system is a light source for a microscopy device or an endoscopy device.

18. An illumination system for a microscopy device or an endoscopy device, the illumination system comprising a plurality of light sources, each comprising a light emitting diode configured to emit a collimated beam of light toward an LED lens, wherein the plurality of light surfaces comprises at least five sources of different colors; and a plurality of reflective optical components oriented parallel and identical to one another, wherein the plurality of reflective optical components comprises four dichroic mirrors configured to direct the first collimated beam, the second collimated beam, the third collimated beam, the fourth collimated beam, and the fifth collimated beam along a common axis, and an output positioned to receive light along the common axis, wherein the output is configured to generate an output beam, wherein the plurality of reflective optical components comprises at least a first set of reflective optical components arranged along a first axis and a second set of reflective optical components arranged along a second axis that is parallel to and offset from the first axis, each of the first set and the second set comprising at least two reflective optical components.

19. The illumination system of claim 18, wherein the LED lens comprises a first aspheric lens and a second aspheric lens, wherein the first aspheric lens is in face-sharing contact with the second aspheric lens.

20. The illumination system of claim 19, wherein the first aspheric lens is adjacent to an LED emitting surface, and wherein the first aspheric lens comprises a plano surface or a concave surface.

* * * * *